US000001361H

United States Statutory Invention Registration [19]

[11] Reg. Number: H1361

Tardiff, Jr. et al.

[43] Published: Oct. 4, 1994

[54] SOFTSHELL PROTECTIVE MASK

[75] Inventors: Albert N. Tardiff, Jr., Germantown, Md.; Corey M. Grove, Red Lion, Pa.

[73] Assignee: The United States of America as represented by the Secretary of the Army, Washington, D.C.

[21] Appl. No.: 879,017

[22] Filed: May 6, 1992

[51] Int. Cl.[5] ..... A62B 7/10; A62B 18/08; A62B 23/02; A42B 1/04

[52] U.S. Cl. ..... 128/206.12; 2/205; 2/427; 128/207.11

[58] Field of Search ..... 128/205.27, 205.29, 128/206.12, 206.13, 206.17, 207.11; 2/2.5, 427, 173, 206, 202, 205

[56] References Cited

U.S. PATENT DOCUMENTS

| | | | |
|---|---|---|---|
| 148,868 | 3/1874 | Barton | 2/202 |
| 2,323,198 | 6/1943 | Bulbulian | 128/206.12 |
| 2,575,483 | 11/1951 | Bethig | 128/206.12 |
| 2,642,574 | 6/1953 | Eloranta | 2/427 |
| 2,799,862 | 7/1957 | Rowe | 2/427 |
| 3,315,674 | 4/1967 | Bloom et al. | 128/206.12 |
| 4,019,508 | 4/1977 | Der Estephanian et al. | 128/206.12 |
| 4,231,118 | 11/1980 | Nakagawa | 2/205 |
| 4,411,023 | 10/1983 | Pinson | 2/205 |
| 4,494,538 | 1/1985 | Ansite | 128/207.11 |
| 4,595,003 | 6/1986 | Shoemaker et al. | 128/206.17 |
| 4,935,308 | 6/1990 | Guerra et al. | 2/159 |
| 4,961,420 | 10/1990 | Cappa et al. | 128/206.12 |
| 4,965,887 | 10/1990 | Paoluccio et al. | 2/9 |
| 5,058,207 | 10/1991 | Altinger | 2/202 |

FOREIGN PATENT DOCUMENTS

| | | | |
|---|---|---|---|
| 146161 | 6/1985 | European Pat. Off. | 128/205.27 |
| 3509784 | 9/1986 | Fed. Rep. of Germany | 2/205 |
| 2210772 | 6/1989 | United Kingdom | 2/205 |

*Primary Examiner*—David Brown
*Attorney, Agent, or Firm*—Anthony T. Lane; Edward Goldberg; Michael Sachs

[57] ABSTRACT

Form-fitting, comfortable, soft-shell protective apparel, commonly called a gas mask, for protecting the head, upper body and respiratory tract from chemical/biological agents and toxins and radioactive particles. A unitary, easy-to-put-on, heat and moisture-dissipating multi-layer construction enables prolonged use and internalizes an adjustable suspension system as well as the purified breathing-air path. The latter is structured to enable the self-contained purifying agent to be located away from the face for facilitating weapons compatibility and reducing fatigue. Goggle-like eye lensing is designed to minimize eye relief and maximize peripheral vision and look-down capability, while providing optical correction and laser-light protection. The mask design minimizes dead space leading to distortion and other communications problems, and enables purifying-agent changes in a "hot" environment.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOFTSHELL PROTECTIVE MASK

GOVERNMENT INTEREST

The invention described herein may be manufactured, used and licensed by or for the United States Government without payment of royalties thereon.

BACKGROUND OF THE INVENTION

This invention relates to protective head and upper body gear, and more particularly to form-fitting softshell apparel with integrated mask and hood for protecting the face, eyes, respiratory tract and general head, neck and upper chest and back areas from so-called CB (chemical/biological) agents, toxins, radioactive particles, and the like. Such arrangements have been commonly termed gas masks or face masks.

Existing military-issue protective head gear assemblies, particularly the face piece portions, are indicative of the current state of the art. A suitable description thereof may be found in the U.S. Army equipment manual TM3-4240-300-20&P, Sections II and III, Pages 1-2 through 1-11, which is summarized briefly herein. Two basic versions of protective face masks are described: the regular M40 series and the more specialized M42 version useful, for example, inside tank vehicles.

The protective head gear assemblies typically are provided in general small, medium and large sizes and are designed to be readily transportable in a suitable carrier. The general face piece characteristics include being constructed of light weight silicone material, with an in-turned surface intended to fit closely and comfortably against the wearer's face to form a viable seal. The face piece is molded to provide buckle-bearing tabs which facilitate securing the mask snugly to the wearer's head, openings for eyelenses, a nose cup, front and/or side voicemitters, an air outlet valve, which may be equipped with a drinking system and/or microphone, and connectors with inlet valves for receiving an air supply hose and/or air-treating filter structures called canisters or pots.

The primary eyelenses are made of rigid clear plastic sealed in their face piece openings by way of metal eyerings. The canister connectors are structured and located so as to allow the canister to be screwed onto either the left or right side of the mouth area of the face piece in the regular M40 model. In the M42, the face piece is provided with a replaceable microphone which can be coupled into the vehicle communications system by the microphone cable provided, and the face mask unit is designed for direct coupling to the vehicle's gas (air) particulate filtering system via, for example, a corrugated tube.

The head gear protective assembly additionally includes a separable head harness or suspension arrangement consisting of elastic webbing straps sewn to a head pad, which is typically rectangular in shape. The harness is buckled to the face piece via the ends of the harness straps. The harness is designed to provide forehead straps for engagement with a like number of face piece forehead buckled tabs and pairs of cheek straps to engage corresponding pairs of face piece buckled cheek tabs, in well known manner. A relatively conforming fit is achieved by adjusting the harness straps in the tab buckles. The suspension system provides the tension necessary to effect the facial seal.

The head gear assembly is completed with the third major system, a hood arrangement which likewise is not attached permanently to the face piece. The hood in fact covers the face piece and suspension systems and provides general protection to the head, neck and shoulders, and the upper parts of the chest and back, against, for example, liquid toxic chemicals. The hood is typically made of lightweight butyl rubber coated fabric, and is provided with suitable conforming snap-in hole areas or apertures for the face piece lenses, the canister pots and the voicemitter.

The face piece system includes a pair of clear and/or preferably neutral gray eye outserts. Each is shaped to seat in a soft rubber ring that fits over the face piece eyerings. The outserts are intended to reduce fogging and sun glare.

Operationally, air enters the canister, is filtered thereby, and then passes through an airflow deflector into the eye area of the face piece. With the M42 unit, air enters the canister or other filtering mechanism and passes through the hose before entering the face piece. From the eye area, the air enters the nose cup through nose cup valves and from there is inhaled by the wearer. Exhaled air passes through the nose cup area and out of the face piece through the outlet valve. The outlet valve is provided with a cover which surrounds the valve with uncontaminated exhaled air.

The existing assemblies, while acknowledged to adequately provide basic protection against CB agents, toxins and inhalation of radioactive particles, present a number of areas of important concern. Regarding the lenses, first of all, very little consideration is given to physical compatibility between the primary lens and its outsert so as to minimize the actual perpendicular separation distance between the lenses when properly assembled together. Additionally, there is inadequate provision for accommodating the lenses of the user who wears corrective eye glasses, particularly whereby minimal perpendicular separation might be achieved between all needed lenses. Most importantly, the lens arrangements are not designed to minimize eye relief by locating the lenses as close to the eye as practically possible. Thus, despite their relatively large size, the primary lenses are effectively too small in view of the excessive separation distance from the eye.

The aforementioned lens separations and lens-to-eye separation, in addition to contributing meaningfully to the bulk of the assembly, pose potentially severe optical problems. The greater the aforesaid perpendicular separation existing between the eye and the outermost lens, the more restricted becomes one's peripheral vision, and so-called "look-down" capability is likewise restricted. Employing current outsert designs to introduce protection against laser light simply exacerbate these problems.

What is needed is a lens system which provides primary, outsert and corrective or prescription lenses closely conforming in shape and largely flattened over the useful area, whereby the perpendicular distances between the lenses, and from the lenses to the eye, are minimized.

It is an objective of this invention to provide a close-fitting, goggle-like lens system with minimal separation between lenses, even with optical correction incorporated, which provides close to normal peripheral vision and is capable of protecting against laser light through employment of low-profile attachments or outserts which do not add significantly to the eye relief value.

As indicated in the foregoing, existing head gear assemblies are disadvantageously comprised of a plurality of separable major parts or systems, in particular the adjustable harness or suspension system, the hood, and the face piece. Thus, an unacceptably lengthy period of time is necessary to put on the gear properly, and because of the numerous holes required to be provided in the hood system to accommodate the lenses, canister connectors, etc., the integrity of the barrier protection can never be assured. The assembly requires a carrier, which typically takes the form of a waterproof bag structure, for housing the various individual parts when not in use.

It is another object of this invention to provide a close-fitting comfortable unitary structure that is easily and rapidly put on, which fully integrates the face piece, suspension system and hood components while ensuring the integrity of the protection sought.

Additional major drawbacks associated with existing head gear assemblies relate to the protruding nose cup, canister connectors, and air outlet valve arrangement. All of these, but most particularly the canisters coupled to the canister connectors to the left and or right sides of the mouth area, as well as the nose cup, tend to so congest the frontal face area as to severely impede the ability to perform simple close-up functions such as communicating via a telephone handset, properly sighting a rifle, or using the sighting systems of larger weapons. They give rise to discomfort, are cumbersome, impede effective function and rapid movement, and cause early fatigue of the user.

By way of example, to effectively accommodate two-way communication, the wearer must hold the telephone handset piece in the front of the mask to talk into the transmitter, and then completely reorient the handset to the ear in order to listen, repeating this process throughout the entire communication. Attempts to alleviate this problem have so structured the breathing path as to disadvantageously increase the breathing resistance. The need thus exists to redefine the breathing path, so as to both alleviate the facial congestion altogether and minimize breathing resistance.

It is thus a further major objective of the invention to entirely remove the canister and associated connectors from the face piece and substantially de-emphasize the nose cup area, while simultaneously decreasing the breathing resistance to substantially normal, greatly reducing the bulkiness of the filter canister itself, and substantially reducing the distance of the air flow through the canister's purifying ingredient(s) without jeopardizing the air-purification process.

The existing multi-piece head gear protective assemblies, in addition to protecting the breathing path and purifying the air stream, are intended to provide a so-called chemical barrier with some measure of protection against puncture. A major drawback thereof, beyond the possible loss of integrity due to the various openings in the hood to accommodate eye lenses, canister connectors and the like, is that such a system is heat and moisture (perspiration) retaining in nature. Consequently, a substantial discomfort element is inherent which becomes exacerbated through prolonged use and leads to potential health hazards.

What is needed is an appropriately constructed unitary protective head gear assembly which not only provides an adjustable secure facial seal, a permanent chemical barrier resistant to puncture, and improved comfort, but which is also capable of effectively dissipating heat and moisture (perspiration) generated by the wearer.

It is yet another major object to provide a layered or laminated unitary construction which accomplishes heat and moisture absorption and dissipation with an inner lining while at the same time provides true permanent chemical barrier protection which is resistant to puncture, in an arrangement designed to allow a flexible form fit to all wearers with an initial-fitting adjustment of a built-in suspension system.

With existing face mask assemblies, it is recommended not to change canisters in a so-called "hot" environment, i.e., an environment in which the use of the face mask is essential. This presents another severe drawback with respect to any contemplated prolonged-use situation, such as sustained ground warfare, in the presence of or involving the use of chemical, biological and/or radioactive agents.

It is thus yet a further object of the invention to provide a breathing path design which enables the safe rapid changing of canisters or their equivalent in an hot environment.

SUMMARY OF THE INVENTION

The foregoing objectives and advantages are realized through the arrangement according to the invention, wherein there is provided improved comfortably conformable, puncture-resistant wearing apparel for protecting the head, neck and respiratory tract areas of the body from harmful chemical, biological and/or radioactive atmospheric contaminants, which provides a source of purified breathing air from such atmosphere and a face piece portion which includes a lens arrangement for direct vision and means to communicate, wherein the improvement comprises, a unitary hood-like laminated construction, having an inner layer composed of a heat and moisture dissipating material and a second layer comprised of material providing a flexible, puncture-resistant contaminant barrier.

Multi-layered unitary construction is provided with respect to hood, suspension system and face piece functions, in a one-size-fits-all design capable of prolonged comfortable wearing which permits the risk-free exchange of filter canisters in the presence of the hazardous and dangerous elements or substances for which the arrangement is designed and intended to protect against.

In a preferred 3-layer arrangement, the outer layer is polyester or cotton (or polyester-cotton combination), the middle layer constitutes the so-called chemical barrier or barrier film, preferably a saran material, and the inner layer is a heat and moisture absorbing/dissipating material such as a hollow-core polyester material. An open cell foam (e.g., silicone) strip outlining the periphery of the face piece may be employed to effect a greater seal of the face area from the rest of the structure when worn.

In a further preferred arrangement, the barrier and puncture-protecting capabilities are combined in a single layer, preferably a bromo-butyl material. In all instances, the unitary protective arrangement covers in addition to the head and neck, the inner shoulders and central upper chest and back.

Formed within the portion of the laminated structure associated with the upper chest and frontal neck areas is the breathing path(s) leading to the face piece. The filter canister is demountably connected to the terminus of the breathing path at the upper chest area by means of a so-called pop-off or spring-loaded (e.g., snap-on, snap-off) design which assures a "closed" state, and thus the integrity of the breathing path, when the canister is not properly seated, i.e., during its removal and replacement.

A suspension system of permanently elastic strips is built into the laminated arrangement preferably between the inner and middle layers, and requires only an initial adjustment by the wearer via one or more preferably flat thumb-wheel or rotary adjustments upon/from which the elastic straps can be taken-up/unwound.

The face piece may be provided with an appropriate seat to house the wearer's corrective eye glasses (minus the ear pieces) proximal to the permanent mask lenses to minimize perpendicular separation. Preferably, however, optically corrective lenses are provided which match the curvature of the primary lenses. Also provided are a pair of conforming outserts constructed for filtering out laser light as well as to control fogging, which contribute only minimally to the perpendicular separation of lenses.

BRIEF DESCRIPTION OF THE DRAWINGS

The foregoing and other advantages and features of the invention will become apparent or better understood with reference to the accompanying drawings in which.

DETAILED DESCRIPTION

Figure 1A:
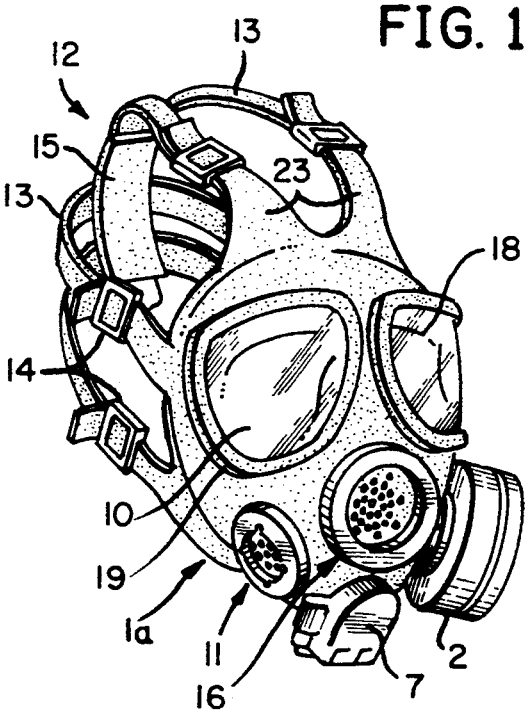
FIGS. 1A and 1B are substantially frontal diagrammatic views of the prior art M40 and M42 head gear units respectively.
Figure 1B:
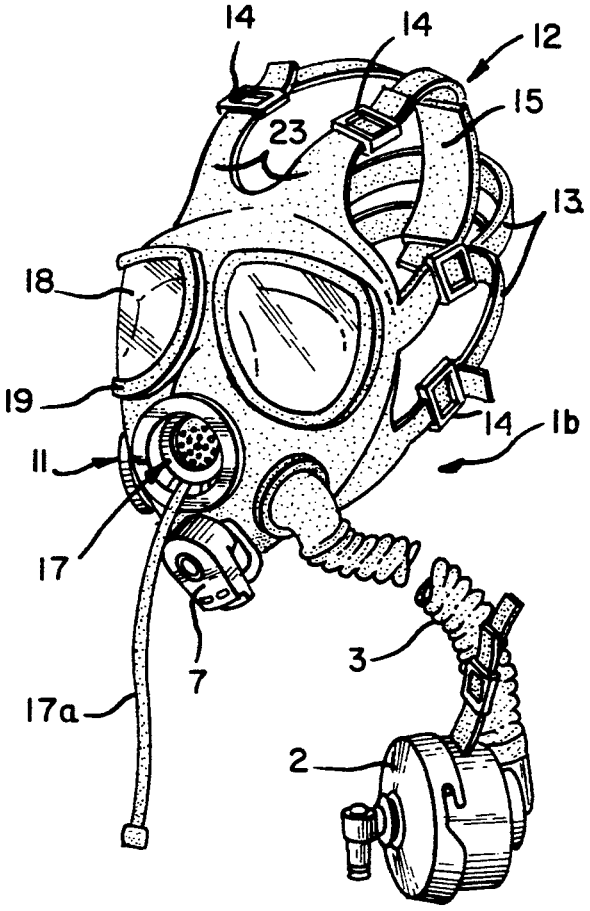
Figure 1C:
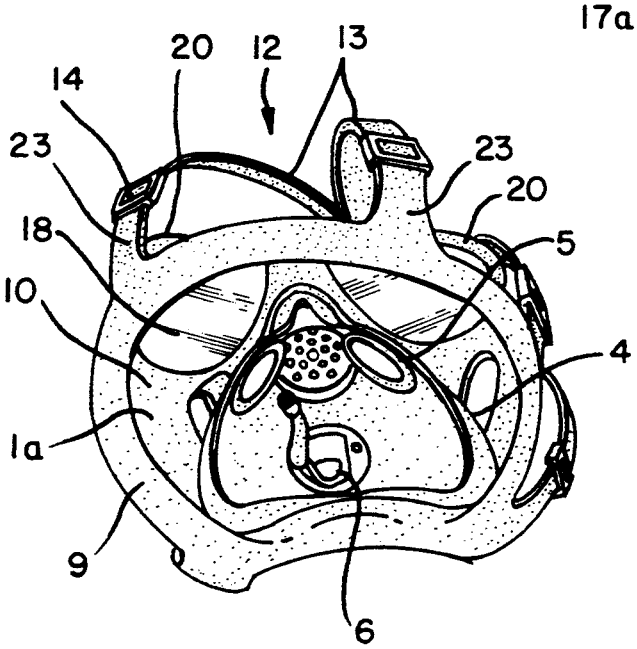
FIG. 1C is a rear diagrammatic view of the mask of FIG. 1A.
Figure 1D:
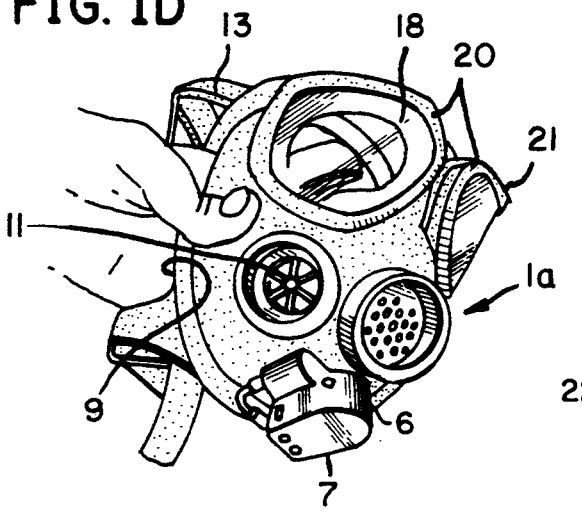
FIG. 1D is a side angle diagrammatic view of the mask of FIG. 1C.
Figure 1E:
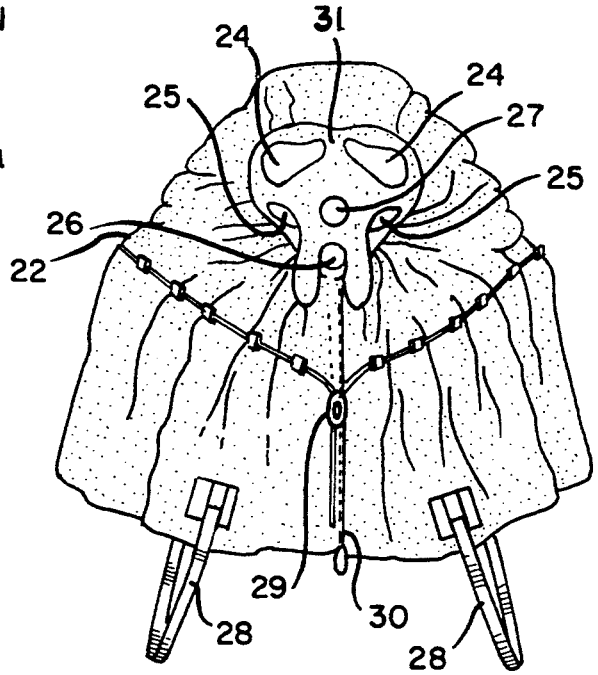
FIG. 1E is a frontal diagrammatic view of the separate hood component used with the masks of FIGS. 1A and 1B.

Referring to the figures, diagrammatically illustrated in FIGS. 1A–1E are the standard prior art protective head and upper body assemblies of the US military. FIGS. 1A, 1C and 1D depict the M-40 series gear and FIG. 1B the M-42 version. The M-42 assembly is typically employed in connection with personnel inside and operating a tank, where the vehicle itself makes provision for radio communications and possibly also air purification to a certain extent. FIG. 1E shows the separable hood piece intended for use with the standard masks.

In FIGS. 1A–1D, the face piece 1*a* (for the M-40), 1*b* (for the M-42) is made of silicone material. Each is shown separably coupled to the suspension system or subassembly 12 as is more particularly described hereinbelow. The face piece has an in-turned peripheral seal 9 (FIG. 1C) for effecting a comfortable seal on the face of the wearer in the M-40 series of masks.

The face piece 1*a*, 1*b* is provided with a pair of threaded connectors 11 located to either side of the mouth area, for receiving an air-purifying canister 2 directly, in the case of the M-40 version, or the air hose 3 leading from the canister 2 (or other purified air source) in the M-42 version. The connectors 11 include an air flow deflector which is intended to facilitate purified air passage into the operative interior of the face piece while ensuring the integrity of the face piece to deliver only air which has passed through a canister. The canister 2 is designed, in well known manner, to filter out CB agents, toxins and radioactive fallout particles from a contaminated atmosphere.

The location of the canister to either side of the mouth and nose area represents an improvement over the earlier frontal mounting of the canister which had inherently greater drawbacks, particularly in terms of vision, communications and compatibility with weapons systems use, such as a rifle. Nevertheless, because the air filter canister 2 is mounted on the face piece, there remains compatibility problems with weapons systems which require the head to come close to the system. Additionally, the weight of the canister hanging from the face piece creates considerable discomfort, adversely affects mobility and leads to early neck fatigue and strain.

Replacement of the canister 2 in the M-40 and M-42 series of masks requires that the canister be unscrewed (and discarded) and a new canister screwed into place. Given the nature of the connection and the time needed to accomplish the cumbersome replacement procedure, it is highly problematical for the wearer to change the canister while in a "hot" environment.

Located in the mouth area of the face piece 1*a*, 1*b* is a frontally arranged voicemitter 16 for face-to-face communications, which in the M-42 version is coupled to a microphone 17 and in turn through the microphone cable 17*a* to an on-board communication system. The one free connector 11, i.e., not dedicated to the canister 2 or hose 3, could be provided with a side voicemitter arrangement for facilitating telephonic communications, though problems with audibility and clarity of speech are increased thereby. Experience has shown intelligibility of voice transmission via telephone (e.g., field radio) is sufficiently poor that most operators are forced to move the handset to the front voicemitter when talking. This naturally removes the speaker of the handset from the ear of the operator and leads to the clumsy telephonic communication technique described hereinbefore.

The current designs of the front voicemitter 6 itself have been shown to pose substantial intelligibility problems. Modified Rhyme Tests indicate that scores of 75% are typical for the M-40 series, whereas experts, for example Human Engineering Labs, have determined that a score of 91% is the minimum needed for adequate communications.

The M-42 version, which has the microphone in the nose cup, has adequate intelligibility. However, the microphone 17 itself poses a problem in that it is too large. A smaller, technically advanced unit would eliminate the need for the excessive dead space required in the nose cup to fit the microphone. This dead space tends to lower the intelligibility of face-to-face communication and causes compatibility problems with weapons systems.

Located below the center voicemitter in the chin area is an air outlet valve arrangement 6 (FIG. 1C), provided with an outlet valve cover 7.

The face piece 1*a*, 1*b* is provided in the eye area 10 with a pair of primary lenses 18, typically made of clear glass or plastic, and each having an eye ring 19. The mask is additionally provided with a pair of demountable outserts or caps 20 for covering the primary lenses 18. Each outsert 20 is seated in a soft rubber ring 21 that fits over the face piece eye rings 19. The rim of the rubber rings 21 fits snugly behind the respective eye rings 19 to protect the eyeglasses from scratches. Neutral gray outserts are typically used to reduce sun glare. The outserts 20 also tend to reduce fogging.

The general shape and arrangement of the eyelenses 18 in the face piece are to accommodate to a certain extent the frame and lens portions of the corrective or prescription eyeglasses of the wearer, effectively mounting the wearer's spectacles (absent the ear pieces) in the mask. The primary lenses 18 are relatively large in overall cross-sectional area to permit a greater field of view. The combination of the primary lenses 18 and the outsert caps 20 provide a closer eye relief than previous masks.

However, the "spectacles in the mask" concept of optical correction does not integrate optical correction into the mask system per se. Additionally, it has been determined the lenses, particularly given the general shape thereof, cannot provide optimum field of view capability. Also, the primary lenses remain too far from the eye of the wearer, providing "look-down" and peripheral vision problems. Of course, the addition of outserts 20, which could be utilized to integrate, for example, laser protection into the mask arrangement, simply exacerbates the aforementioned eye relief problems.

Eye relief generally experienced with the M-40 series masks, even without the outsert caps 20, is in the range of forty-five millimeters. As a result, many sighting devices within the military inventory either cannot be effectively used or the field of view is unacceptably reduced. The eye relief typically required is on the order of twenty to twenty-three millimeters.

Interiorly, the face piece la is provided with a nose cup portion 4 which contains nose cup air valves 5 (FIG. 1C). Valves 5 are relatively low-resistance flapper-type valves providing a generally acceptable breathing path resistance. The total breathing path resistance for the system, including the canister 2, which itself provides an approximate 45-millimeter (water) resistance, and the flapper valves, is, however, on the order of fifty-five millimeters of water. Thus, the canister 2, and to some extent the valves 5, represent portions of the purified air path where breathing resistance needs to be substantially reduced.

The face piece is secured to the head of the wearer by way of a suspension system 12 which is comprised of a series of pairs of straps 13, three in the model depicted in FIGS. 1A–1D, all terminating in a flexible rectangular piece 15 intended to fit the back part of the head of the wearer. The suspension system is demountably coupled to the face piece 1*a*, 1*b* by a series of pairs of metallic buckles permanently mounted on tabs 23 of the face piece, such that one tab 23 and buckle 14 combination is provided for each strap 13 of the suspension system 12.

The standard head and upper body protective assembly is completed with the hood system 22 illustrated in FIG. 1E. The hood 22 is generally composed of a lightweight butyl rubber coated nylon fabric. It is intended to be worn over the face mask 1*a*, 1*b*. Thus, the head portion 31 of the hood 22 is provided with a number of apertures shaped to accommodate the functional aspects of the mask in a close fit arrangement. These apertures comprise the pair of eye openings 24, the canister holes 25, the outlet valve hole 26 and the voicemitter opening 27.

The hood 22 is additionally provided with a pair of elastic arm straps 28, located proximate the lower part of the hood and appropriately to either side of the center upper chest area, a draw string arrangement 29 of well known construction, located about the shoulders and upper chest area, and a fastener 30 which is vertically oriented and centered upon the neck and chest areas, which may take the form of a Velcro arrangement.

The general lack of comfort in the existing designs is the product of several factors. The suspension system 12 has relatively thick strapping and metal buckles 14 which cause hot spots on the wearer's head. The hood is essentially not conformable and is bulky. This in turn causes movement to be awkward. The combined weight of the mask, hood and canister on the head causes neck strain. The relatively heavy filter bounces when the user moves quickly, which tends to cause the mask to jerk the head of the wearer. And, the nose cup itself causes discomfort with many users.

There is no moisture removal mechanism. The hood and mask assembly is comprised of non-permeable materials which encapsulate the head, neck and shoulders areas. This can quickly lead to a heat stress situation, brought on by the build-up of moisture or perspiration within the assembly.

Figure 2:
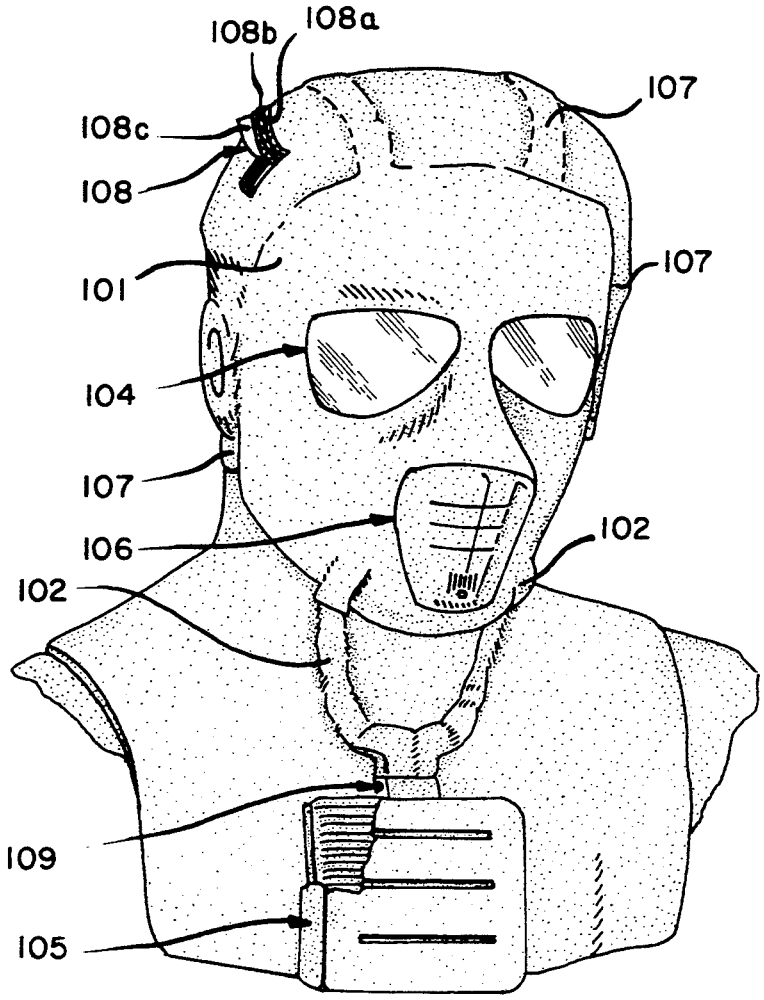
FIG. 2 is a substantially frontal diagrammatic view of the upper body protective arrangement according to the invention, illustrating particularly the inventive multi-layered construction and unique breathing path.

Referring to FIG. 2, the head and upper-most body area protective gear of the invention is illustrated. This softshell arrangement is unitary in construction, incorporating the separable face piece, suspension and hood systems of the prior art. Unlike the prior art, however, the unitary construction of the instant invention guarantees the integrity of the gear.

In a preferred embodiment, the softshell protective arrangement is constructed of a layered hood material 108, the outer laminate or shell being for example bromo-butyl material 108*a* which provides the (chemical) barrier function as well as the strength necessary to resist puncture or other loss of integrity of the gear from forceful contact, and an inner liner of a hollow-core fiber fabric material 108*c*, for example polyester or a polyester/cotton combination, for wicking heat and perspiration from the wearer's skin surface. The inner liner 108*c* absorbs the heat and moisture into itself and distributes same throughout the hood and primarily down into the chest and back areas of the hood for effective dissipation. A strip of spongy open cell foam material, for example silicone, may be employed to interiorly outline the face portion of the hood to seal the face area from the rest of the head.

In a further preferred embodiment, a three-layer hood 108 is provided wherein a puncture resistant material 108*a*, such as a polyester or cotton material (or combination thereof) forms the outer layer and the chemical barrier, for example a saran material, constitutes the intermediate layer 108*b*.

The hood is designed to be easily pulled over the head. It is light-weight and largely conformable to the head, neck and upper central chest and back, which together with the aforesaid lining eliminates the bulkiness and restriction of movement associated with the within-discussed prior art arrangements.

Integrated within the hood, preferably within the laminated structure itself, i.e., between the intermediate (or outer) and inner layers, is the suspension system which is comprised of a series of permanently elastic strips 107 extending from the face piece 101 to terminate in one or more flat plastic take-ups or adjustments (not particularly shown) proximate the back of the head, in the form of thumb wheels or rotary recessed finger loops. The thumb wheel or rotary adjustments advantageously allow for varying the tension on the elastic strips to enable the hood arrangement to comfortably conform to the wearer's head, in essentially a one-time adjustment process. Preferably, the adjustments are structured to snap-out into the adjusting position and snap-in to a "locked" position following adjustment, thus providing full conformity with the head. The internal suspension system provides the wearer with additional increased comfort due to the elimination of the heavy strapping and bulky metal buckles which cause hot spots when worn over extended periods of time.

The face piece portion 101 incorporated into the unitary hood arrangement provides lens system 104 which effectively integrates optical correction as a part of the primary lens structure. An optically corrective lens is integrated with the primary lens by matching the outside curvature of the corrective lens to the inside curvature of the primary lens. The primary lenses are substantially flattened in the area of optical correction and take on a wrap-around shape outside the area of optical correction. A balanced system is employed to eliminate distortion between the flat area and the wrap-around portion.

Laser protection is integrated into the overall lens system by matching the outside curvature of the primary lens to the inside curvature of a laser protective lens. Integration of the laser lens to the primary lens is such that only the thickness of the laser lens itself causes an increase in eye relief. The laser outserts may be coupled to the primary lens structures in a manner similar to that provided in the existing mask arrangements.

The depicted goggle shape of the lenses, coupled with the close fit to the wearer, and matching curvature of all lenses within the system, provide a maximized field of view. By bringing the lenses as close as practically possible to the eye, there is achieved compatibility with most sighting systems. The close-fitting face piece allows for compatibility with weapons systems requiring the head to come close to the system. Look-down capability is assured with the described lens system which in turn assures compatibility with, for example, electronic display screens.

In the arrangement according to the invention, the air filter or canister is no longer located on the face piece, thus permitting the wearer to bring either side of the face close-in to a weapons system. The filter 105 is located instead centrally on the upper chest. It is coupled to the protective hood arrangement by a suitable filter change mechanism 109, which employs a state of the art snap-fit connect mechanism, such as a dual-button squeeze release or disconnect design, with an appropriate gasket for providing a leak-proof seal. In a preferred arrangement, mechanism 109 is provided with a spring-loaded clapper valve arrangement whereby the wearer is protected when the filter is removed and which automatically assumes its open position when the filter is properly in place.

Filter change mechanism 109 is in turn the origin of a pair of air passageways 102 built into the hood. A single air passage branches into the dual passageways proximate the output of the filter change mechanism, with each passageway extending within the protective hood to either side of the jaw and into the interior of the face mask portion proximate the mouth and nose area, terminating in the substantially abbreviated open space about the nose and mouth.

The filter 105, shown in partial breakaway in FIG. 2, is generally rectangular in shape and lies flat against the chest. It's centralized position on the upper chest enables the wearer to see what his or her hands are doing while changing the filter. This ability together with the snap-on, snap-off design greatly facilitates filter changes.

The filter structure, in addition to posing less of an interference via its flattened structure, nevertheless has a higher cross-sectional area than that of a conventional filter system, which were necessarily of smaller design to reduce the impediment factors of the device when mounted on the face piece, as discussed herein. Because of the broadened area through which air can flow in the inventive arrangement, the thickness of the air path through the air purification substance(s) can be effectively lessened without compromising the purification function, which in turn enables the filter to have a reduced front-to-back physical dimension. The higher cross-sectional area and reduced length of air path through the purifier, coupled with the lower resistance valve arrangement of mechanism 109, provides a air filtration function with approximately thirty millimeters (water) of breathing resistance, in contrast to almost double the breathing resistance of the prior art filter/-breathing path arrangements.

The protective arrangement of the invention includes a communication system 106 which may include a voicemitter or amplified communications device (e.g., a microphone) designed to improve intelligibility over the existing masks. The microphone is a miniaturized unit which allows substantial reduction in the dead space or volume in which speech occurs, compared to existing face pieces, thus effecting corresponding reductions in system losses. The reduced frontal profile achieved by the reduced dead space and elimination of the uncomfortable nose cup area also enhances compatibility when undertaking telephonic communications and with weapons systems use.

In a preferred embodiment, the special vibrating membrane generally associated with the face piece may be eliminated, and the face piece area behind the external plate of communication device 106 and protected thereby may have the puncture-resistant layer and/or the moisture-dissipating layer of the lamination eliminated. In this instance where only the chemical barrier lamina, is retained, a preferred strong but thin and lightweight barrier material employed, such as a saran, will provide substantially improved intelligibility due to the corresponding reductions in speech value losses and distortion.

There has been described herein a softshell protective mask and upper body arrangement which integrates the separable hood, suspension system and face piece assemblies of the prior art into a unitary construction which is more conformable to the wearer and requires much less time to put on. The unitary arrangement integrates optical correction and laser light protection into the lens system while providing advantageously increased eye relief and corresponding greater field of view and compatibility with weapons systems. A vastly improved purified air path design has been provided, particularly in terms of breathing resistance, reduced physical interference, fatigue factors and the filter change capability, and substantial improvement in comfort is achieved, particularly in terms of heat burden.

What is claimed is:

1. Protective apparel for protecting the head, neck and respiratory tract areas of a human body from harmful chemical, biological, or radioactive atmospheric contaminants and which also provides a source of purified breathing air from such atmosphere, said apparel comprising:

hood means including a face piece portion which has a lens arrangement for direct vision and a communication device in said face piece portion at the position of nose and mouth regions located on said face piece portion, said hood means being comprised of unitary laminated construction of material having a first layer composed of a heat and moisture dissipating material, a second layer comprised of material providing a contaminant barrier, and a third layer comprised of material providing a flexible, puncture-resistant barrier, said hood means further including a suspension system in the head portion of said hood means, said suspension system comprising a series of permanently elastic strips extending from said face piece portion, attached between the said first and second layer materials; and said source of purified breathing air being provided by a separable air-purifying filter external to said hood means, said filter shaped in a substantially flattened structure, and including connecting means for enabling rapid disengagement and replacement of such filter without loss of integrity of the purified air, wherein said connecting means divides to form a pair of paths of purified air flow, one path extending to either side of the neck and jaw areas of the wearer.

2. Protective apparel according to claim 1, wherein said first layer material is from the class of hollow-core fiber fabrics which includes polyester and a polyester-cotton combination.

3. Protective apparel according to claim 2, wherein said second layer is of saran material.

4. Protective apparel according to claim 3, wherein said third layer is from the class of flexible chemically protective materials which includes bromobutyl.

* * * * *